Oct. 8, 1929.  F. H. ROYCE  1,731,151
CHANGE SPEED GEARING
Filed Feb. 27, 1926   2 Sheets-Sheet 2
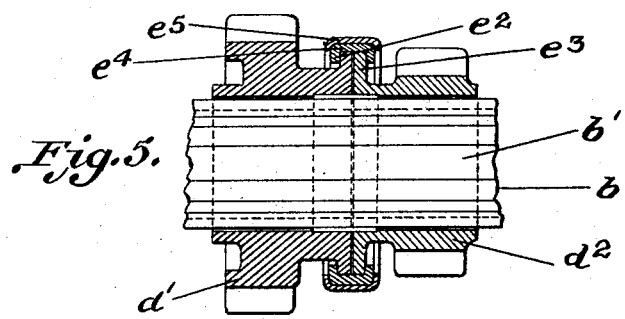
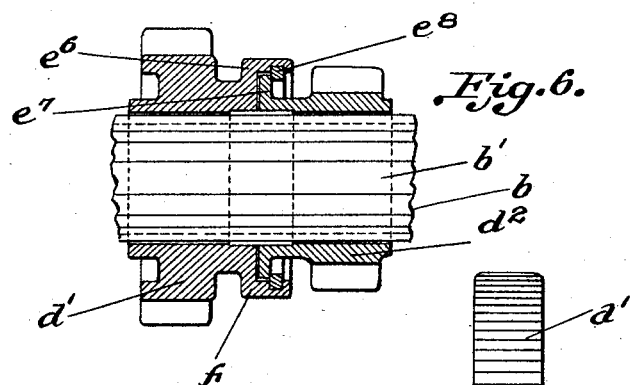
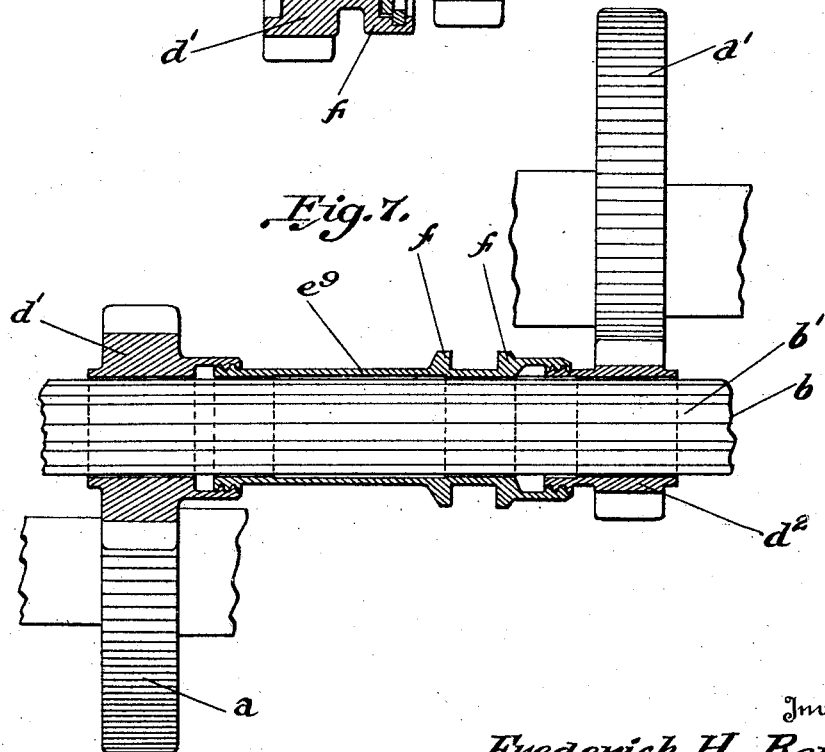
Inventor
Frederick H. Royce
By
Attorneys Patented Oct. 8, 1929

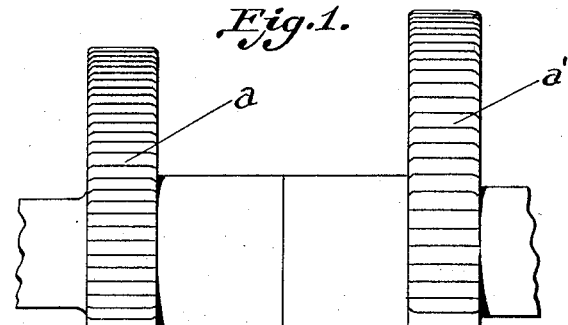
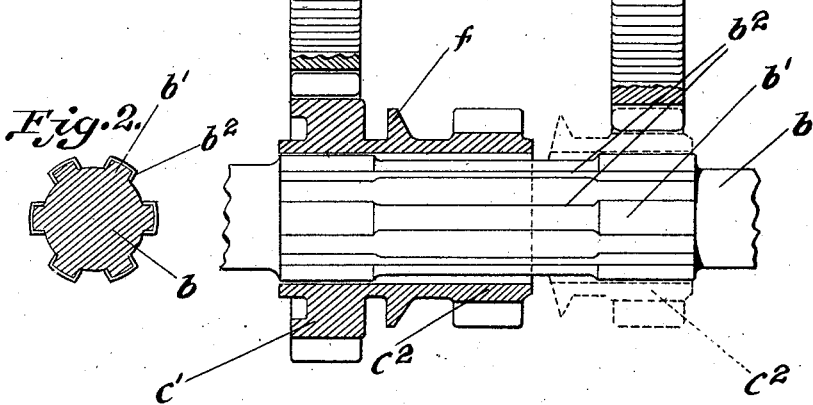
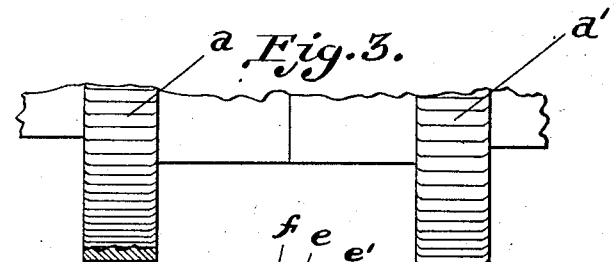
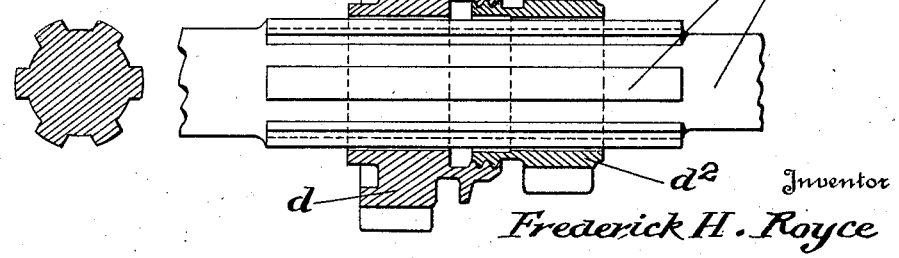

1,731,151

UNITED STATES PATENT OFFICE

FREDERICK HENRY ROYCE, OF WEST WITTERING, NEAR CHICHESTER, ENGLAND, ASSIGNOR TO ROLLS-ROYCE LIMITED, OF DERBY, ENGLAND

CHANGE-SPEED GEARING

Application filed February 27, 1926, Serial No. 91,560, and in Great Britain March 17, 1925.

This invention has reference to change speed devices for engines and has for its object to prevent axially moveable pinions from creeping into or out of mesh.

In the common form of change speed devices there are sometimes double or compound axially moveable gears forming a single unit and consisting of two pinions with a space between them on which are arranged collars to engage a fork. This unit is internally splined and is mounted on a splined shaft (the splines mutually engaging) or is by some other means while axially slideable fixed to the shaft for rotation, and is moveable in one direction to bring one of the pinions into mesh with its complementary wheel, and in the other direction to bring the other pinion into mesh with its complementary wheel. In such compound gears when one pinion is in mesh the whole unit is in driving or driven contact with its shaft through the engaging splines for the entire length of the unit, although the applied force is through one pinion with the result that the pressure along the engaging splines is uneven, and this coupled with shaft deflection and other effects causes a tendency for the unit to creep axially.

According to this invention I arrange that the engaging surfaces of the shaft and unit whether that of splines or otherwise are opposite the forces applied through the teeth of the respective pinions and that forces tending to disturb the axial location of the gear are eliminated or reduced.

This may be effected for example by arranging that the sides of the splines or other engaging surfaces on the shaft for a distance intermediate the driving or driven (as the case may be) positions of the pinions are slightly cut away. In the case of splines they may also be similarly cut away on their surfaces. In another method of securing the desired end the compound pinions are not made integral but are secured together so as to be relatively torsionally free, and in addition have some very slight universal freedom relatively such as might be obtained by a slack coupling between them. For example any of the couplings hereinafter described and illustrated may be adopted.

The principle of this invention is applicable in cases where (as in some reverse gearing arrangements) the members of a double or compound slideable gear on a revolving shaft are respectively put in or out of mesh with two complementary pinions on separate shafts at the same time in which case (owing to shaft deflection and other effects) the like tendency to creep is experienced. In this case the two pinions can be likewise loosely joined together but they must then be engaged to the shaft so that the drive is through the shaft although otherwise in such cases they could be free on their own shaft. Where the reverse pinions are engaging complementary wheels located a distance apart in the gear box they can be connected by means of a sleeve with loose connections as above referred to. This sleeve in some cases may preferably be in driving engagement with the shaft.

In the accompanying drawings are illustrated examples of my invention.

Fig. 1 illustrates a double or compound gear all in one piece with internal splines engaging splines on the shaft the latter splines being cut away as described. Fig. 2 is a section of Fig. 1 through the shaft at a point where the splines are cut away. Figs. 3, 5, 6 and 7 show double or compound gear with the two members made separately and secured with a loose joint by alternative methods, and Fig. 4 is a section of the shaft in Figs. 3, 5, 6 and 7.

Referring to all the figures, $a$ and $a^1$ are respectively complementary pinions with which the compound slideable gears are to be engaged, $b$ is the shaft on which the movable gears are mounted such shaft having axial splines $b^1$ formed thereon which are engaged by splines on the gears. Referring to Figures 1 and 2 the splines on the shaft are cut away on their sides as shown at $b^2$. $c^1$ and $c^2$ are the two members of compound integrally formed gear shown with the member $c^1$ engaged with pinion $a$. The position of the member $c^2$ when engaged with pinion $a^1$ is shown by dotted lines. It will be observed that the member which is not in engagement with a pinion is running quite free from the splines on the shaft and the load on the splines is solely through the engaged pinions.

Referring to Figures 3, 4, 5, 6 and 7 $d^1$ and $d^2$ are respectively the elements of the compound gear, the two elements being connected for axial movement but not for rotational movement.

Referring to Figure 3, $e$ and $e^1$ are flanges respectively projected from the elements $d^1$ and $d^2$ and respectively with internal and external threads which engage with one another. These threads may be V shaped or square and are arranged to allow a suitable radial clearance.

Referring to Fig. 5 $e^2$ and $e^3$ are radial flanges respectively formed integral with the pinions $d^1$ and $d^2$, $e^4$ is a bush formed in two halves and $e^5$ is a ring embracing the two halves of the bush and "spun over" as shown to hold the two halves together.

Referring to Fig. 6 $e^6$ and $e^7$ are respectively a cylindrical and a radial flange respectively integral with members $d^1$ and $d^2$ which interlock as shown and $e^8$ is a split spring ring which seats in an annular recess in the flange $e^6$ thus holding the members $d^1$ and $d^2$ together for axial movement.

Referring to Figure 7 the members of the compound gear $d^1$ and $d^2$ are remote from one another and are intended to be brought into engagement with pinions of different shafts for the purpose, for example, of a reverse drive. They are connected together by a sleeve $e^9$ which connects at each end with the members by any suitable coupling admitting of relative rotational movement, the form shown in this figure being similar to that shown in Fig. 3. It is essential in this arrangement that the members should be in driving engagement with the shaft by means of splines or otherwise as distinct from rotating around the shaft which latter arrangement might be adopted in the case of an integrally formed double gear. Referring to all the drawings, $f$ are collars which form either themselves or in conjunction with a face of a pinion, an annular recess to take the engaging fork.

It will of course be realized that there are other suitable forms of coupling between the two members of the compound gear than those indicated which are only given as examples.

What I claim is:—

1. In change speed gearing including a shaft, a compound gear having separate gear elements non-rotatably fixed to each other and slidably mounted on said shaft to move to predetermined operative positions on said shaft, means for connecting said gear to slide on and rotate as a whole with said shaft, said means being formed to operatively engage only one of said gear elements when the compound gear is in any of said predetermined positions, said connecting means including splines on the driving shaft having the sides thereof cut away between said predetermined positions to prevent rotary driving contact with the element not operatively engaged.

2. Change speed gearing including a shaft, a member splined to slide non-rotatably on said shaft and having gears of different diameters formed thereon, means for sliding said member from one predetermined location on said shaft to another, the splines on said shaft being laterally reduced between said locations to prevent rotary driving contact with part of said member when the latter is positioned in one of said locations.

In witness whereof I have signed this specification.

FREDERICK HENRY ROYCE.